United States Patent [19]

Braga et al.

[11] Patent Number: 5,082,869

[45] Date of Patent: Jan. 21, 1992

[54] CROSS-LINKED POLYPROPYLENE COMPOSITIONS SUITABLE FOR THE PREPARATION OF FOAMED MATERIALS

[75] Inventors: Vittorio Braga; Renato Ghisellini, both of Ferrara, Italy

[73] Assignee: Ausimont S.p.A., Milan, Italy

[21] Appl. No.: 666,103

[22] Filed: Mar. 7, 1991

[30] Foreign Application Priority Data

Mar. 9, 1990 [IT] Italy .............................. 41004 A/90

[51] Int. Cl.$^5$ ............................................. C08J 9/00
[52] U.S. Cl. .................................. 521/134; 525/193; 525/240
[58] Field of Search ................ 521/134, 143; 525/193, 525/240

[56] References Cited

U.S. PATENT DOCUMENTS 4,212,787 7/1980 Matsuda et al. ..................... 521/140
4,247,652 1/1981 Matsuda et al. ..................... 521/140

Primary Examiner—Morton Foelak
Attorney, Agent, or Firm—Morgan & Finnegan

[57] ABSTRACT

This invention relates to PP compositions, particularly suitable for the preparation of foamed materials, comprising, by weight:

a) 3–75% of cross-linked PP
b) 97–25% of not cross-linked PP, having ($\eta$) comprised between 0.50 and 1.3 dl/g, and are characterized by:
   M.I. (230° C., 2.16 Kg) comprised between 0.001 and 600 kg/10'
   cross-linked PP as dispersion in the not cross-linked PP,
   and in form of about spheroidal gels of 0.5–100 microns and to a process for the preparation of the above mentioned compositions, comprising to allow a mix of PP with peroxidic cross-linking, a furane derivative co-agent and optionally a foaming agent, to undergo a dynamical vulcanization.

1 Claim, 4 Drawing Sheets

CROSS-LINKED POLYPROPYLENE COMPOSITIONS SUITABLE FOR THE PREPARATION OF FOAMED MATERIALS

FIELD OF THE INVENTION

The present invention relates to compositions consisting of, or comprising an intimate mixture of cross-linked polypropylene and of not cross-linked polypropylene, suitable for the preparation of foamed manufactured articles.

BACKGROUND OF THE INVENTION

Compositions or manufactured articles consisting of cross-linked polypropylene and non cross-linked polypropylene, obtained by cross-linking of polypropylene performed with organic peroxides and in the presence of cross-linking co-agents consisting of double or triple bonds, and optionally of foaming agents are known from the European Patent Application No. 73435.

According to this Patent Application, the preformed manufactured article to be cross-linked, is treated in an autoclave containing an aqueous solution of the peroxide and of the co-agent, at the cross-linking temperature. Alternatively, the manufactured article, obtained by extruding at temperature between 160° and 180° C. a mix comprising polypropylene, the peroxide and the co-agent, is separately cross-linked at temperatures between 180° and 230° C., without overpressure, or under reduced or high pressure.

These compositions show a poor homogeneousness and can be worked with difficulty. The foamed articles which are obtained do not have the flexibility requirements which are requested for many applications.

DESCRIPTION OF THE INVENTION

The Applicant has now found, and are one of the object of the present invention, polypropylene compositions endowed with high processing characteristics and homogeneousness such to be used for the preparation of foamed materials having extraordinarily little and regular cells. These compositions, which are one of the objects of the present invention, comprise an intimate mix consisting of from 3 to 75% by weight of cross-linked polypropylene and of from 97 to 25% by weight of non cross-linked polypropylene, characterized by:

a) values of the intrinsic viscosity at 135° C. in tetrahydronaphthalene of the non cross-linked polypropylene comprised between 0.5 and 1.30 dl/g, but preferably between 0.6 and 1 dl/g and even more preferably between 0.9 and 1.3 dl/g.

b) values of MI (at 230° C. and 2.16 kg) comprised between 600 and 0.001 kg/10', and preferably between 80 and 0.01 kg/10'; and c) the cross-linked polypropylene is present as dispersed phase in the non cross-linked polypropylene (matrix) and it is in form of gels showing approximately spheric form, having size comprised between 0.5 and 100 microns, but preferably between 0.5 and 10 microns and more preferably between 0.5 and 5 microns.

The term cross-linked polypropylene means the polypropylene which is unsoluble in xylene at 135° C. On the contrary, by the term non cross-linked polypropylene means, the polypropylene soluble in xylene at the above mentioned temperature.

Preferably, the above mentioned compositions comprise from 7 to 40% by weight of cross-linked polypropylene and from 93 to 60% by weight of non cross-linked polypropylene.

The compositions which are the object of the present invention can be obtained by allowing a mixture comprising:

a) isotactic polypropylene,
b) a cross-linking agent for the propylene, of the peroxidic type;
c) from 5 to 500%, but preferably from 7 to 150% by weight calculated on the peroxidic agent, of a compound (co-agent) comprised in one of the following general formulae:

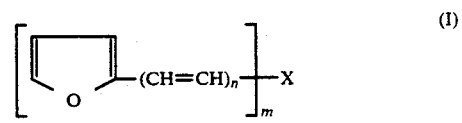

(I)

wherein: X is a radical of the formula —CHO, —COOH, —CONH$_2$—, —NO$_2$, —COOCO—, —COOR, —CO—, —CH$_2$COCH$_2$COOR, —CH(COOR)$_2$, wherein R is an aryl containing from 6 to 8 C, or an alkyl containing from 1 to 4 C;

n=1 or 2;

m=a number corresponding to the free valence of X;

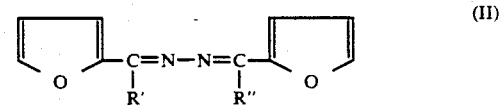

(II)

wherein R' and R" equal to or different among them, can be hydrogen, or alkyl radicals containing from 1 to 4 C, or cycloalkyl containing from 5 to 8 C, and preferably from 6 to 8 C, to mastication or to the action of other shear forces, at a temperature sufficient to melt the polypropylene and at which the cross-linking of propylene occurs.

Examples of preferred furane derivatives comprised in the formulae (I) and (II) which can be used for the purposes of the present invention are 1,5-difurfuryl-1,4-pentadiene-3-one and difurfuraldazine.

Other examples are provided by furane compounds described in U.S. Pat. No. 3,301,837, some examples of which are: β-(alpha-furyl)acroleine; 5-(alpha-furyl)-pentadienal; β-(alpha-furyl)-acrylamide; β-(alpha-furyl)acrylonitrile; β-(alpha-furyl) acrylo acid and esters thereof; bis-furfurylidenacetone; β-(alpha-furyl)ethyl-β-(alpha)acroleine; esters of the furfurylidenmalonic acid; condensation products of the β-(alpha-furylacroleine) with cyclic ketones, according to what is described in Berichte 76, 676 (1943).

The above mentioned compounds are known in the art. Their preparation can be carried out for instance according to what is described in U.S. Pat. No. 3,301,827.

Therefore, a further object of the present invention is the process for the preparation of the above defined compositions which comprises to allow a mixture of components from (a) to (c) above specified to cross-link under the action of shear forcess.

The polypropylene may be either in the form of homopolymer of propylene, or in the form of copolymer of propylene with other copolymerizable olefinic monomers, such as for instance ethylene, butene-1, butadiene, taken in quantities up to 10% by weight and generally in amounts comprised between 0.5 and 10% by weight on the copolymer. In this last case the copolymer may be either of the block type (heterophasic) or of the random type.

The peroxidic cross-linking agent consists of an organic peroxide, preferably selected from those showing a half time on the order of from 10 to 400 seconds at the cross-linking temperatures. This temperature is preferably comprised between 150° and 240° C.

Examples of peroxides which can be used are: dicumylperoxide; alpha, alpha'-bis(t.butylperoxy)-m-, and-/or p-diisopropylbenzene (TBPDB); 1,1-d-t.butyl-peroxide-3,5,5-trimethylcyclohexane; 2,5-dimethyl-2,5-di(t.butylperoxy)hexane.

The quantities used of the cross-linking agent and of the co-agent depend on the cross-linked polypropylene percentage which is desired in the final composition. These quantities may be easily calculated according to criteria well known to those skilled in the art based on the activity and functionality both of the cross-linking agent and of the co-agent used. Generally, for the aims of the present invention, it is the mentioned quantity is comprised between 0.1 and 5% by weight on the polypropylene weight.

The process for the preparation of the compositions of the present invention comprises generally the preparation of an intimate mixture of the above listed components from (a) to (c) and thereafter its heating during the mixing or the mastication step or under the action of other shear strains, at a temperature at least equal to the melting temperature of the polypropylene and at which the cross-linking of polypropylene occurs.

The duration or the end of the cross-linking under these conditions is determined by the quantity of the used cross-linking agent, calculated in such a manner to obtain a composition containing from 3 to 75% by weight of cross-linked polypropylene on the total polypropylene.

Generally, the cross-linking temperature is kept, as above said, between 150° and 240° C., and preferably between 180° and 240° C.

The cross-linking is completed when the cross-linking agent is no longer present in the composition.

Mineral fillers, organic and/or inorganic pigments, stabilizers and additives which are generally used in the olefinic and non olefinic polymers, as well as quantities up to 10% by weight of EPM rubbers can be present in the preparation of the compositions of the present invention together with components (a)-(c).

The preparation of the starting mix of components from (a) to (c) and optional additives, as well as the cross-linking of the mix itself are performed in suitable apparatus, such as for instance a Banbury, a screw extruder of the Buss type, or of the double-screw type provided with mixing elements.

Preferably, devices used are those able to use creep gradients comprised between 350–5000s$^{-1}$, and preferably between 500 and 3000s$^{-1}$.

BACKGROUND DESCRIPTION OF THE FIGURES

The particular morphology of the compositions of the present invention FIGS. 1,2,3 and 4) characterizes this cross-linking type and differentiates these compositions from those which can be obtained by cross-linking under static conditions; in fact, in this last case, the morphology of the compositions is geometrically less defined, and in general it is of the interpenetrated type (see FIGS. 5,6,7 and 8) with a behaviour under heating similar to that of a cross-linked elastomer. For this reason, these compositions as such are poorly processable.

DETAILED DESCRIPTION OF THE INVENTION

Figure 1:
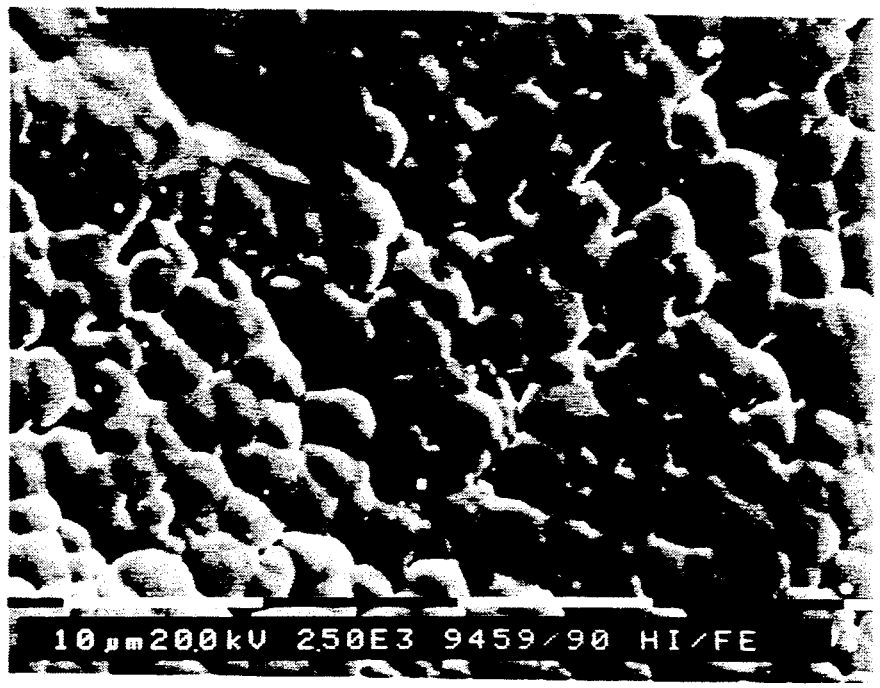
Figure 2:
Figure 3:
Figure 4:
Figure 5:
Figure 6:
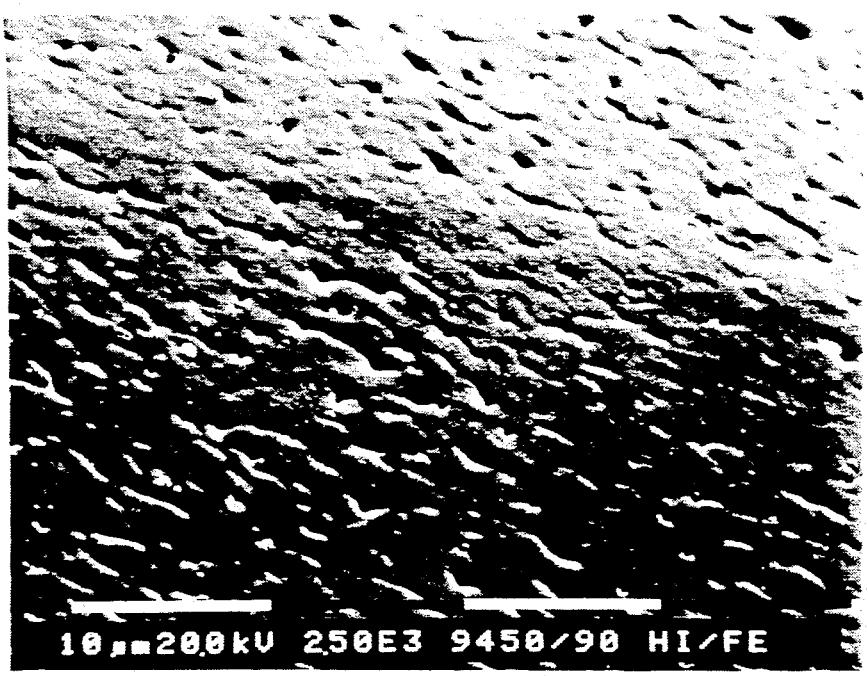
Figure 7:
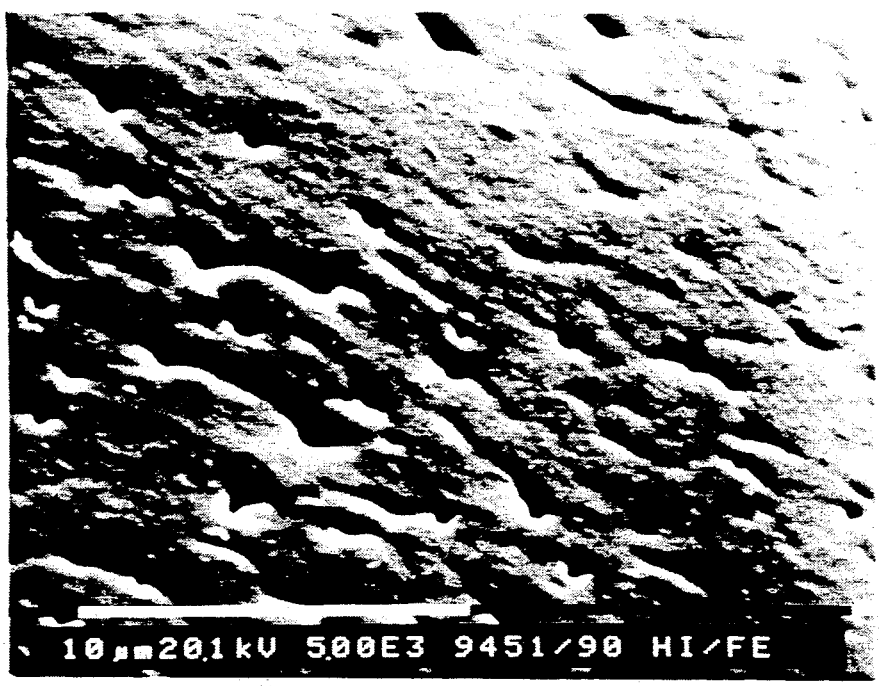
Figure 8:
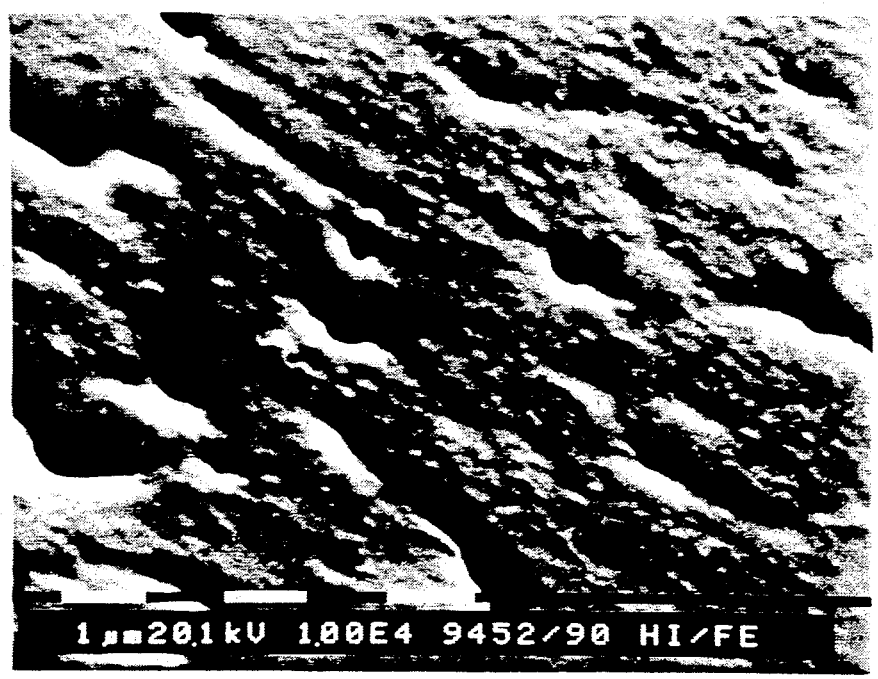

The compositions of this invention are characterized by a high melt strength and by a behaviour of the elastomeric type of the melt itself in connection with low creep gradients although they remain surprisingly processable.

As previously said, the compositions of the present invention are particularly suitable to be used for the preparation of foamed materials.

For this preparation it is possible to work by incorporating a foaming agent into the cross-linked product, then extruding the mixture using a homogenizing monoscrew extruder which shows and maintains up to the head a reduction decrease of clearance between throat and chambers, in such a manner to allow the expansion to occur at the outlet. Alternatively, it is possible to work in an injection press, having a profile of the homogenizing screw which keeps the mixture of the polypropylene composition with the foaming agent under pressure and using a mold provided with air breathers. In both cases the extruder temperature is preferably comprised between 180° and 200° C.

According to another method, the foamed material can be obtained during the preparation of the cross-linked composition, by feeding into a double-screw extruder a mixture of non cross-linked polypropylene and co-agent, while introducing on the molten material both the cross-linking agent and the foaming agent at a distance from said feeding point equal to $\frac{2}{3}$ of the extruder length and allowing the whole to proceed along the extruder under conditions of reduced volume up to the outlet.

In this last case, the temperature has to be generally kept between 170° and 200° C.

Foaming agents used can be of chemical or physical type. In the first case their decomposition temperature has to be comprised between 170° and 220° C.

Examples of foaming agents of the chemical type which can be used are azodicarbonamides, sulfonylhydrazides, dinitropentamethylentetramine, p-toluensulfonylsemicarbazide, trihydrazine-triazine and generally all the products used in the art for such purpose, having decomposition temperatures at least equal to the melt temperature of polypropylene.

As physical foaming agents all those known in the literature to these aims can be used, for instance, chlorofluoro carbons, aliphatic hydrocarbons containing a low number of carbon atoms, such as for instance propane, butane, pentane etc.

Foamed materials thus obtained which are a further object of the present invention, comprise a mixture consisting of from 3 to 75% by weight of cross-linked isotactic polypropylene and of from 97 to 5% by weight of non cross-linked polypropylene having an intrinsic viscosity comprised between 0.50 and 1.30 dl/g, this mixture showing a MI between 600 and 0.001 kg/10' (measured at 230° C. and 2.16 kg); the foamed materials are of the closed cell type and have a density comprised between 0.2 and 0.4 g/cm$^3$.

EXAMPLES

EXAMPLES 1-13

These examples illustrate the preparation of the compositions according to the invention using cross-linking agents, co-agents and different polymers. Working conditions and characteristics of the obtained compositions are listed in Table 1.

The compositions have been prepared by allowing the polypropylene to melt by heating at 180° C. in an inner mixer of the Bräbender type (60 rpm), then adding the co-agent and thereafter the cross-linking agent.

The composition is continuously mixed at the above mentioned temperature for 10 minutes, under a creep gradient of about 350–700 sec$^{-1}$.

After this period of time, active peroxide is no longer present in the composition.

EXAMPLES 14-15

These examples illustrate the preparation of compositions according to the invention by extrusion.

To this purpose the work has been carried out using a double-screw extruder of the MARRIS type, having L/D=30, diameter 33 mm, working at 150 rpm and at temperatures comprised between 180° and 230° C.

A mixture of polypropylene and cross-linking co-agent obtained in a dry mixer, was introduced in the extruder, while adding the cross-linking agent at a distance from the introduction zone equal to ⅔ of the extruder lenght.

The creep gradient under which the mixture was extruded was about 2000 sec$^{-1}$ in the example 15 and about 3000 in the example 14.

The thus obtained product was then molded in an injection press of the Negri and Bossi N60 type, working at 200° C., with the mold kept at 40° C. and under an injection pressure of 30%.

The cross-linking working conditions and the characteristics of the sample thus prepared are reported in Table 2.

Cross-linked compositions obtained as above described were further used for the preparation of foamed materials either by extrusion or by presso-injection according to the following modalities.

Extrusion

The operation was carried out with a single screw Bräbender extruder, characterized by L/D=20, diameter=20 mm, diameter of the head matrix equal to 2 mm, working at a temperature from 180° to 200° C. along the body and from 150° to 190° C. at the head, introducing a mixture prepared in a dry mixer, consisting of the cross-linked composition of examples with 0.5% by weight of azodicarbonamide.

Presso-injection

The work was carried out with a Negri and Bossi N60 press, temperature of the cylinder 200° C., temperature of the mold equipped with breadner channels of 40°–50° C., injection pressure between 30 and 90%, using the same mixture with azodicarbonamide already used for the preparation by extrusion.

The characteristics of the foamed materials are reported in Table 2.

EXAMPLE 16

This example relates to the manufacture of foamed material according to the invention, during the preparation of the cross-linked composition.

To this aim, a mixture of polypropylene having M.I.=8 and difurfuralaldazine were fed into a double-screw extruder working at a temperature between 180° and 200° C., along the body and between 150° to 190° C. at the head under a creep gradient of about 2800 sec$^{-1}$, while introducing in the extruder, at a distance from said feeding point equal to ⅔ of the extruder length, the peroxide and the foaming agent (azodicarbonamide).

In the present table there are reported the amount of reactants and the characteristics of the foamed product.

TABLE

| | | |
|---|---|---|
| Polypropylene | parts by weight | 100 |
| Difurfuralaldazine | parts by weight | 0.45 |
| Peroxide (TBPDB) | parts by weight | 3 |
| Azodicarbonamide | | 0.5 |
| Characteristics of the obtained product | | |
| Density | g/cm$^3$ | 0.25 |
| Homogeneity | — | very good |

TABLE 1

| | | Comparison | 1 | 2 | 3 | 4 | 5 |
|---|---|---|---|---|---|---|---|
| Polypropylene (M.I. = 0.7)* | parts by weight | 100 | 100 | 100 | 100 | 100 | 100 |
| Polypropylene (M.I. = 8)* | parts by weight | — | — | — | — | — | — |
| Polypropylene (M.I. = 25)* | parts by weight | — | — | — | — | — | — |
| Statistic copolymer of polypropylene with 2% of ethylene (M.I. = 8)* | parts by weight | — | — | — | — | — | — |
| Block copolymer of polypropylene with 2% of ethylene (M.I. = 3.5)* | parts by weight | — | — | — | — | — | — |
| Polypropylene (M.I. = 8) +10% EPM** | parts by weight | — | — | — | — | — | — |
| Di-furfural-aldazine (coag) | parts by weight | — | 0.22 | 0.45 | 0.9 | 0.76 | 1.5 |
| Peroxide (TBPDB) | parts by weight | 3 | 3 | 3 | 3 | 5 | 5 |
| 1,5-difurfuryl-1,4-pentadiene-3-one | parts by weight | — | — | — | — | — | — |
| Characteristics of the composition after cross-linking | | | | | | | |

TABLE 1-continued

| | | | | | | | |
|---|---|---|---|---|---|---|---|
| Cross-linked polypropylene | % | 3.0 | 7.6 | 12 | 39 | 40 | 63 |
| Intrinsic viscosity of the not cross-linked polipropylene | dl/g | <0.4 | 0.75 | 0.90 | 0.88 | 0.50 | 0.55 |
| M.I. (230° C., 2.16 kg) | kg/10' | >700 | 610 | 1.40 | — | 0.18 | — |
| M.I. (230° C., 5.00 kg) | kg/10' | — | — | — | 0.94 | — | — |
| M.I. (230° C., 10.00 kg) | kg/10' | — | — | — | — | — | 1.09 |
| Gel size | | All the particles had size between 0.5 and 100μ, with 60% thereof having size between 5 and 40μ. | | | | | |

| | 6 | 7 | 8 | 9 | 10 | 11 | 12 | 13 |
|---|---|---|---|---|---|---|---|---|
| Polypropylene (M.I. = 0.7)* | 100 | — | — | — | — | — | — | — |
| Polypropylene (M.I. = 8)* | — | 100 | — | — | — | — | — | 100 |
| Polypropylene (M.I. = 25)* | — | — | 100 | — | — | — | — | — |
| Statistic copolymer of polypropylene with 2% of ethylene (M.I. = 8)* | — | — | — | 100 | — | — | — | — |
| Block copolymer of polypropylene with 2% of ethylene (M.I. = 3.5)* | — | — | — | — | 100 | — | — | — |
| Polypropylene (M.I. = 8) +10% EPM** | — | — | — | — | — | 100 | 100 | — |
| Di-furfural-aldazine (coag) | 1.3 | 0.76 | 0.76 | 0.76 | 0.76 | 0.45 | 0.76 | — |
| Peroxide (TBPDB) | 9 | 5 | 5 | 5 | 5 | 3 | 5 | 3 |
| 1,5-difurfuryl-1,4-pentadiene-3-one | — | — | — | — | — | — | — | 0.45 |
| Characteristics of the composition after cross-linking | | | | | | | | |
| Cross-linked polypropylene | 71 | 23 | 35 | 43 | 34 | 10 | 41 | 17 |
| Intrinsic viscosity of the not cross-linked polipropylene | 0.50 | 0.62 | 0.60 | 0.64 | 0.70 | 1.25 | 1 | 0.91 |
| M.I. (230° C., 2.16 kg) | — | 0.36 | 0.20 | 0.045 | 0.095 | 5.71 | 0.28 | 1.95 |
| M.I. (230° C., 5.00 kg) | — | — | — | — | — | — | — | — |
| M.I. (230° C., 10.00 kg) | 0.85 | — | — | — | — | — | — | — |
| Gel size | All the particles had size between 0.5 and 100μ, with 60% thereof having size between 5 and 40μ. | | | | | | | |

*Measured at 230° C.; 216 kg
**Containing 72% by weight of ethylene, and having Mooney viscosity (1 + 4) 100° C. = 28

TABLE 2

| | | EXAMPLES | |
|---|---|---|---|
| | | 14 | 15 |
| Polypropylene (M.I. = 8) | parts by weight | 100 | — |
| Statistic copolymer of propylene with 10% of ethylene (M.I. = 8) | parts by weight | — | 100 |
| Difurfural aldazine | parts by weight | 0.45 | 0.76 |
| Peroxide (TBPDB) | parts by weight | 3 | 5 |
| CHARACTERISTICS OF THE COMPOSITION AFTER CROSS-LINKING | | | |
| Cross-linked polypropylene | % | 3 | 25 |
| M.I. (230° C.; 2.16 kg) | | 39 | 5 |
| CHARACTERISTICS OF THE MOLDED SAMPLES | | | |
| Rockwell hardness R | | 101 | 87 |
| Ultimate tensile strength | MPa | 21.5 | 19.2 |
| Ultimate elongation | % | 3 | 5 |
| Flexural modulus at 23° C. | MPa | 1420 | 940 |
| Izod (notch) at 23° C. | J/m | $13^R$ | $23^R$ |
| Vicat (1 kg) | °C. | 142 | 125 |
| HDT 0.46 MPa | °C. | 112 | 85 |
| CHARACTERISTICS OF FOAMED MATERIALS | | | |
| By extrusion | | | |
| density | g/cm³ | 0.3 | 0.2 |
| homogeneity | | very good | very good |
| By presso-injection | | | |
| density | g/cm³ | 0.3 | 0.2 |
| homogeneity | | very good | very good |

We claim:

1. Foamed materials, having density between 0.2 and 0.4 g/cm³ comprising a mixture having melting index (at 230° C., 2.16 kg) between 0.001 and 600 kg/10' consisting of:

A) 3–75% by weight of cross-linked polypropylene;
B) 97–25% by weight of non cross-linked polypropylene, having intrinsic viscosity in tetrahydronaphthalene at 135° C. between 0.50 and ⅓ dl/g.

* * * * *